No. 889,297. PATENTED JUNE 2, 1908.
J. M. DALY.
CLUTCH DRIVING DEVICE.
APPLICATION FILED MAR. 27, 1905.
2 SHEETS—SHEET 1.
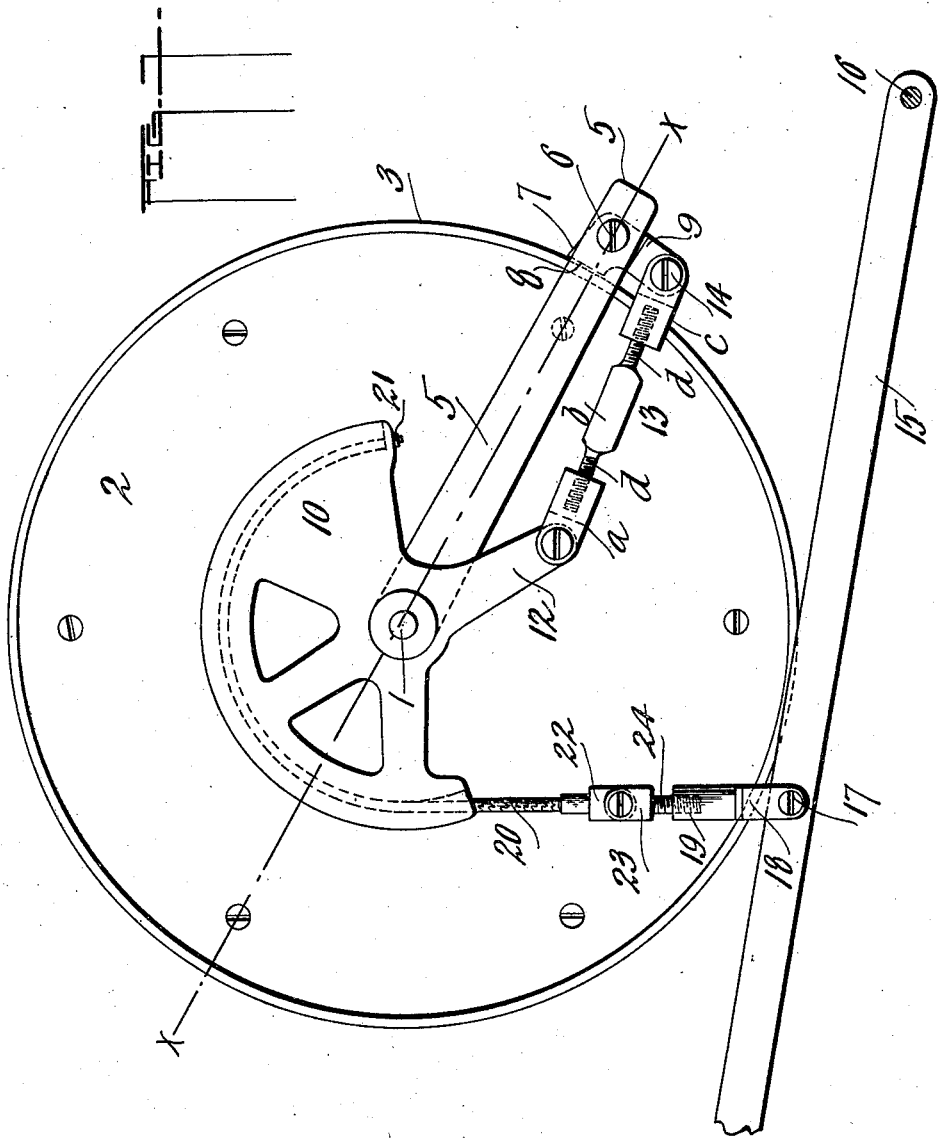

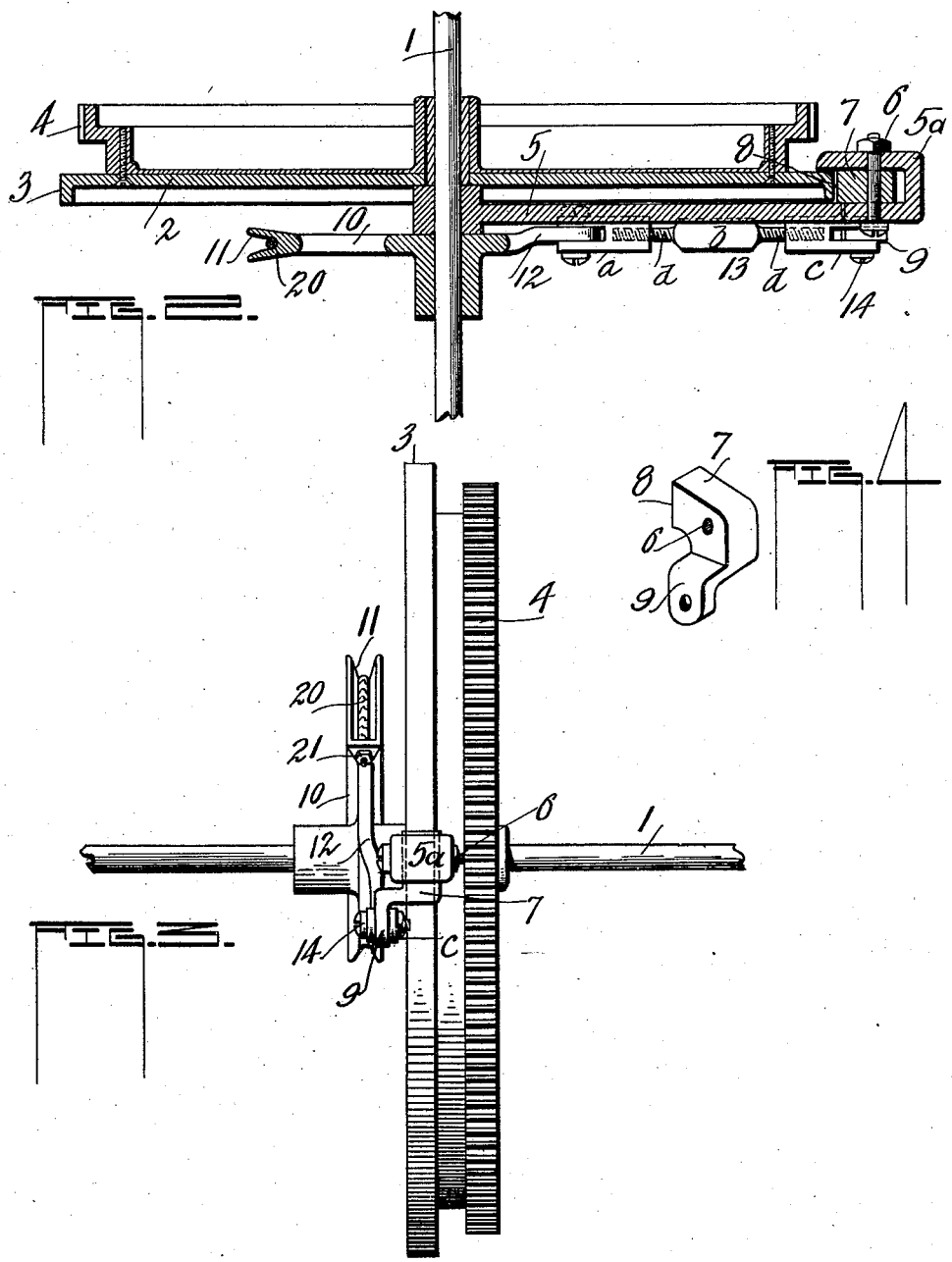

UNITED STATES PATENT OFFICE.

JOHN M. DALY, OF CHICAGO, ILLINOIS.

CLUTCH DRIVING DEVICE.

No. 889,297.  Specification of Letters Patent.  Patented June 2, 1908.

Application filed March 27, 1905. Serial No. 252,543.

*To all whom it may concern:*

Be it known that I, JOHN M. DALY, a citizen of the United States, residing at Chicago, in the county of Cook and State of Illinois, have invented certain new and useful Improvements in Clutch Driving Devices; and I do hereby declare that the following is a full, clear, and exact description of the invention, which will enable others skilled in the art to which it appertains to make and use the same.

This invention has reference to a clutch mechanism, and has for its particular object a positive smooth face clutch.

The invention is adapted to all hand and foot power machines, such as gig-saws, lathes, circular-saws and blowers for forges or similar machines.

It has for its further object a clutch drive wherein may be facilitated the converting of horizontal or vertical movement into a rotary motion.

The invention comprises a driving wheel having preferably a smooth periphery, said wheel attached to a driving gear or forming a part of any suitable balance wheel or pulley; a shaft to which the balance wheel is secured. An arm is loosely carried on the shaft, to the outer end of which is pivotally connected a clutch pawl adapted to be oscillated for engaging the face of the wheel aforesaid. On said shaft is also carried a segment disk, preferably loose and to the disk is attached a rod or member, which, at its outer end is pivotally connected to the clutch-pawl, adapted when the segment-disk is rocked on the shaft to cause the pawl to frictionally engage the face of the wheel, to move the same simultaneously with the movement of the segment-disk. Suitable means are provided, whereby by hand or foot power the segment-disk may be rocked, to facilitate in rotating or partially rotating the wheel through the instrumentality of the clutch-pawl and connections as specified.

That the invention may be more fully understood, reference is had to the accompanying drawings, in which:—

Figure 1 is a side elevation of my improved clutch devices, applied to a smooth face wheel and showing a lever for operating the same; Fig. 2 is a cross-section on the line X—X of Fig. 1; Fig. 3 is an edge view of the parts seen in Fig. 1, omitting the lever, and Fig. 4 is a detail perspective of the clutch-pawl.

Like numerals of reference indicate corresponding parts throughout the figures.

In the drawings 1, denotes a shaft, to which is secured a wheel 2, of suitable size, the same having a smooth periphery 3, as shown. To this wheel is secured a gear wheel 4, which may be either the ordinary spur-gear, or of other suitable form for the purpose of transmitting motion.

On the shaft 1 is loosely carried an arm 5, which extends out beyond the periphery of the wheel 2 and provided with a yoke formed by an off-set extension 5$^a$ which overlaps the far edge of the said wheel. In this yoke is pivotally connected at 6 a clutch-pawl 7. The pawl is provided with a smooth engaging face 8 adapted to engage the peripheral face of the wheel and prevented from lateral displacement by the yoke in which it is carried.

9 is a laterally carried off-set or extension, to which parts are connected, to be described.

10 denotes a member, in this instance a segment-disk, the periphery of which is grooved as at 11; and from the body of the member extends a finger or arm 12 to the outer end of which is pivotally connected a three piece arm 13, the outer end of which is pivotally connected at 14 to the off-set 9 of the pawl 6, see Fig. 1. The arm 13 comprises the sections *a*, *b*, *c*. *a* and *c* having threaded sockets in which threaded ends *d*, of section *b* have screw connection, to provide for an adjustable connection between the pawl 6 and the arm 12.

The arm 5 is carried adjacent to the wheel 2 and on the shaft intermediate the member 10 and said wheel.

For operating the clutch-pawl to cause the same to impinge the peripheral face of the wheel 2, I have shown a lever 15 pivoted at 16 to a shaft, spindle or suitable frame part, and pivotally attached to said lever, preferably at 17 is a link 18, provided with a threaded socket 19.

20 denotes a flexible cable which is carried in the groove 11 of the member 10 and at 21 is secured thereto. The opposite end of the cable 20 is attached to a lug 22 to which is pivotally connected a link 23 which has a threaded stud 24 adapted to have screw connection with the socket 19 of the link 18.

From the foregoing description, it will be seen that upon depressing the lever 15, the member 10 through the connection of the cable 20 therewith and with the lever, will rock or partially rotate the said member 10 on the shaft 1. On such movement, or rather at the beginning of such movement the arm 12 and the rod 13 will be moved outwardly, which will rock the clutch-pawl 6 on its pivot, causing the engaging face 8 thereof to impinge the face of the wheel; and upon the continued movement of the lever 15 cause to rotate or be partially rotated the wheel 2. The release of the pawl is accomplished when the lever 15 is released by the operator. The arm 5 drops again to its normal position and by so doing returns the member 10 and lever 15 to their normal position, through the connections described. Very little movement of the lever 15, it will be seen, is necessary to lock the clutch-pawl to the face of the wheel.

The arrangement of clutch parts herein is peculiarly adapted to machines where it is desired to transmit a variable movement; or if desired the application of the invention may be to hand or foot power machines where at intervals constant movement is desired.

The adjustable connection between the member 10 and the clutch pawl makes it possible to vary the amount of lost motion between the treadle 15 necessary to allow the pawl to grip the wheel.

Having thus fully described my invention, what I claim and desire to secure by Letters Patent of the United States, is:—

1. In a device of the character described, a shaft, a wheel carried thereby and having a smooth periphery, an arm loosely carried on the shaft, a clutch-part pivoted to said arm and adapted to frictionally engage the peripheral face of the wheel, a member loosely mounted on the shaft, adjustable connections between member and clutch-part, and means for rocking the member and thereby impart movement to wheel and shaft through the pawl aforesaid.

2. In a device of the character described, a shaft, a wheel carried thereby having a smooth periphery, an arm loosely carried on the shaft, a clutch-part pivoted to said arm and adapted to frictionally engage the peripheral face of the wheel, a member loosely mounted on the shaft, adjustable connections between member and clutch-part, a lever for actuating the member, and a flexible connection between the said member and lever.

3. In a device of the character described, a shaft, a wheel carried thereby having a smooth periphery, an arm loosely carried on the shaft, a clutch-part pivoted to said arm and adapted to frictionally engage the peripheral face of the wheel, a member loosely mounted on the shaft, adjustable connections between member and clutch-part, a lever for actuating the member, and an adjustable connection between the said member and lever.

4. In a device of the character described, a shaft, a wheel carried thereby and having a smooth periphery, an arm loose on the shaft, a clutch-part pivoted to the arm and adapted to frictionally engage the peripheral face of said wheel, a segment-disk loose on the shaft, a link pivoted at one end to the segment-disk and its opposite end pivoted to the clutch-part, and means for actuating the said segment-disk.

5. In a device of the character described, a shaft, a wheel carried thereby and having a smooth periphery, an arm loose on the shaft, a clutch-part pivoted to the arm and adapted to frictionally engage the peripheral face of said wheel, a segment-disk loose on the shaft provided with a grooved edge, a link having a pivotal connection with the segment-disk and with said clutch-part, a lever, and a flexible connection between the segment-disk and lever, said flexible connection having a portion lying in the groove aforesaid of the segment-disk.

6. In a device of the character described, a shaft, a wheel carried on said shaft and having a smooth periphery, an arm loosely carried at one end of the shaft and projecting out beyond the edge or periphery of the wheel, a pawl pivotally connected to the outer end of the arm and adapted to frictionally engage the peripheral face of the wheel, a segment disk loose on the shaft and disposed within the circumferential lines of the wheel, said disk provided with a groove in its peripheral face and also provided with an arm extension, a link pivotally connected with the extension of the disk and also pivotally connected with the pawl, means for adjusting the connection between the pawl and the disk, a lever, a flexible connection between the lever and the disk, which said connection has a portion thereof lying in the groove of the disk, and means for adjusting said flexible connection.

In testimony whereof I affix my signature, in presence of two witnesses.

JOHN M. DALY.

Witnesses:
JULIUS I. IVERSON,
EDWARD J. REILLY.